(12) United States Patent
Li et al.

(10) Patent No.: US 12,035,417 B2
(45) Date of Patent: Jul. 9, 2024

(54) CAPABILITY CONFIGURATION METHOD AND APPARATUS FOR CONFIGURING A NETWORK SLICE OF A RADIO ACCESS NETWORK

(71) Applicant: Huawei Technologies Co., Ltd., Shenzhen (CN)

(72) Inventors: Junchao Li, Shanghai (CN); Hao Tang, Ottawa (CA); Guohua Zhou, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/372,306

(22) Filed: Jul. 9, 2021

(65) Prior Publication Data

US 2021/0400467 A1 Dec. 23, 2021

Related U.S. Application Data

(63) Continuation of application No. PCT/CN2020/071529, filed on Jan. 10, 2020.

(30) Foreign Application Priority Data

Jan. 11, 2019 (CN) .......................... 201910028288.6

(51) Int. Cl.
*H04W 8/22* (2009.01)
*H04W 24/02* (2009.01)

(52) U.S. Cl.
CPC ............. *H04W 8/22* (2013.01); *H04W 24/02* (2013.01)

(58) Field of Classification Search
CPC ............................... H04W 8/22; H04W 24/02
See application file for complete search history.

(56) References Cited

U.S. PATENT DOCUMENTS

| 2018/0249441 A1 | 8/2018 | Ryoo et al. |
| 2018/0368053 A1 | 12/2018 | Wei et al. |

(Continued)

FOREIGN PATENT DOCUMENTS

| CN | 106572516 A | 4/2017 |
| CN | 106657194 A | 5/2017 |

(Continued)

OTHER PUBLICATIONS

Motorola Mobility, Lenovo, Broadcom, "Solution: Multiple Independent Slices per UE," SA WG2 Meeting #116bis, Sanya, P.R. China, S2-165185, total 7 pages (Aug. 29-Sep. 2, 2016).

(Continued)

*Primary Examiner* — Jackie Zuniga Abad
(74) *Attorney, Agent, or Firm* — Leydig, Voit & Mayer, Ltd.

(57) ABSTRACT

A capability configuration method and an apparatus are provided. The method includes: sending, by a network device, capability configuration information to a terminal device, where the capability configuration information is used to indicate a capability corresponding to an air-interface slice supported by the terminal device, and the capability corresponding to the air-interface slice supported by the terminal device is determined from a capability candidate set reported by the terminal device; and communicating, by the network device, with the terminal device by using the air-interface slice supported by the terminal device.

16 Claims, 5 Drawing Sheets

(56) References Cited

U.S. PATENT DOCUMENTS

| | | | | |
|---|---|---|---|---|
| 2018/0376414 | A1* | 12/2018 | Zeng | H04W 8/02 |
| 2020/0244507 | A1* | 7/2020 | Pan | H04W 72/51 |
| 2020/0314678 | A1* | 10/2020 | Lee | H04W 72/12 |
| 2020/0344034 | A1* | 10/2020 | Moon | H04L 5/10 |

FOREIGN PATENT DOCUMENTS

| | | |
|---|---|---|
| CN | 107343306 A | 11/2017 |
| CN | 107872884 A | 4/2018 |
| CN | 108810993 A | 11/2018 |
| CN | 108924857 A | 11/2018 |
| CN | 109121185 A | 1/2019 |

OTHER PUBLICATIONS

Huawei, HiSilicon, "Motivation for new WI on LTE connectivity to 5G-CN enhancements," 3GPP TSG RAN Meeting #80, La Jolla, USA, RP-181058, XP051510968, total 3 pages, 3rd Generation Partnership Project, Valbonne, France (Jun. 11-14, 2018).

ZTE, ZTE Microelectronics, "Consideration on the support of URLLC in NR," 3GPP TSG-RAN WG2 Meeting #96, Reno, USA, R2-168473, XP051178063, total 6 pages, 3rd Generation Partnership Project, Valbonne, France (Nov. 14-18, 2016).

\* cited by examiner

BWP 1 (60 kHz)     BWP 2 (30 kHz)

CAPABILITY CONFIGURATION METHOD AND APPARATUS FOR CONFIGURING A NETWORK SLICE OF A RADIO ACCESS NETWORK

CROSS-REFERENCE TO RELATED APPLICATIONS

This application is a continuation of International Application No. PCT/CN2020/071529, filed on Jan. 10, 2020, which claims priority to Chinese Patent Application No. 201910028288.6, filed on Jan. 11, 2019. The disclosures of the aforementioned applications are hereby incorporated by reference in their entireties.

TECHNICAL FIELD

This application relates to the field of communications technologies, and in particular, to a capability configuration method and an apparatus.

BACKGROUND

A fifth generation (5G) technology is expected to support various scenarios and service types through a same network. The various scenarios include autonomous driving, a smart city, a smart grid, a smart factory, and the like. Various services include an enhanced mobile broadband (eMBB) service, an ultra-reliable and low latency communications (URLLC) service, a massive machine type communications (mMTC) service, and the like. Different scenarios and/or different services usually correspond to different requirements. For example, the eMBB service usually pursues a high throughput and high spectral efficiency, the URLLC service usually pursues high reliability and a low latency, and the mMTC service usually pursues wide coverage and a big connection. Optimal system performance cannot be achieved if a same set of parameters is used to support such various scenarios and service types. For example, optimization for high reliability and a low latency is usually implemented at the cost of reduced spectral efficiency. Therefore, the 3rd generation partnership project (3GPP) proposes to support various scenarios and service types of a 5G system by using a network slice. At a radio access network level, the network slice is implemented by using an air-interface slice. A core network is divided into a plurality of network slices, and each network slice is carried by using one air-interface slice, to implement a specific service requirement on a terminal device side.

However, when a terminal device may support a plurality of air-interface slices, there is no clear solution on how to configure a capability of the terminal device in each air-interface slice, and this is a problem that needs to be urgently resolved.

SUMMARY

Embodiments of this application provide a capability configuration method and an apparatus, to resolve a problem of how to define a capability of a terminal device when the terminal device supports a plurality of air-interface slices.

According to a first aspect, an embodiment of this application provides a capability configuration method, including: A network device sends capability configuration information to a terminal device, where the capability configuration information is used to indicate a capability corresponding to an air-interface slice supported by the terminal device, and the capability corresponding to the air-interface slice supported by the terminal device is determined from a capability candidate set reported by the terminal device; and the network device communicates with the terminal device by using the air-interface slice supported by the terminal device.

According to the method, the network device configures, for the terminal device by using the capability configuration information, the capability that matches the air-interface slice supported by the terminal device, to ensure that the network device and the terminal device have a common understanding of the capability in the air-interface slice supported by the terminal device. In this way, a problem of how the network device determines a capability of the terminal device in each air-interface slice when the terminal device supports a plurality of air-interface slices is resolved.

In a possible design, the capability candidate set includes at least one unique capability, and the unique capability is a capability whose quantity increases with a quantity of air-interface slices.

In a possible design, the capability candidate set includes a first unique capability, and the first unique capability is physical uplink shared channel PUSCH preparation duration T1 and uplink bandwidth part BWP switching duration T2 that correspond to the terminal device on a first radio frequency channel. PUSCH timing duration required by the air-interface slice supported by the terminal device is T3. When T3 is greater than or equal to a maximum value between T1 and T2, the capability indicated by using the capability configuration information includes the first unique capability.

In a possible design, the capability candidate set includes at least one shared capability, and the shared capability is a capability whose quantity does not increase with the quantity of air-interface slices.

In a possible design, the capability candidate set includes a first shared capability, and the first shared capability is a maximum control channel blind detection capability, and is used to indicate a maximum quantity B1 of control channel blind detections to be performed by the terminal device. The capability indicated by using the capability indication information includes a maximum quantity B2 of control channel blind detections to be performed by the terminal device in at least two air-interface slices, where B2 is less than or equal to B1.

According to a second aspect, an embodiment of this application provides a communications apparatus. The communications apparatus includes a processor, and the processor is coupled to a memory. The memory is configured to store instructions. The processor is configured to perform the method according to any one of the first aspect or the possible designs of the first aspect based on the instructions stored in the memory. Optionally, the communications apparatus may further include the memory. Optionally, the communications apparatus may further include a transceiver, configured to support the communications apparatus in sending and/or receiving information in the foregoing method. Optionally, the communications apparatus may be a network device, or may be an apparatus in a network device, for example, a chip or a chip system. The chip system includes at least one chip, and the chip system may further include another circuit structure and/or a discrete device.

According to a third aspect, an embodiment of this application provides a communications apparatus, configured to implement the method according to any one of the first aspect or the possible designs of the first aspect. The communications apparatus includes corresponding functional modules, for example, a processing unit and a communications unit, which are respectively configured to implement the steps in the foregoing method.

According to a fourth aspect, an embodiment of this application provides a capability configuration method, including: A terminal device receives capability configuration information from a network device, where the capability configuration information is used to indicate a capability corresponding to an air-interface slice supported by the terminal device, and the capability corresponding to the air-interface slice supported by the terminal device is determined from a capability candidate set reported by the terminal device; and the terminal device communicates, by using the capability indicated by using the capability configuration information, with the network device in the air-interface slice supported by the terminal device.

According to the method, the terminal device obtains the capability configuration information from the network device, where the capability configuration information is used to indicate the capability that is configured for the terminal device and that matches the air-interface slice supported by the terminal device, to ensure that the network device and the terminal device have a common understanding of the capability in the air-interface slice supported by the terminal device, so that the terminal device determines a capability in each air-interface slice.

In a possible design, the capability candidate set includes at least one unique capability, and the unique capability is a capability whose quantity increases with a quantity of air-interface slices.

In a possible design, the capability candidate set includes a first unique capability, the first unique capability is physical uplink shared channel PUSCH preparation duration T1 and uplink bandwidth part BWP switching duration T2 that correspond to the terminal device on a first radio frequency channel, and a sum of PUSCH timing duration required by air-interface slices supported by the terminal device is T3.

When T3 is greater than or equal to a maximum value between T1 and T2, the capability indicated by using the capability configuration information includes the first unique capability.

In a possible design, the capability candidate set includes at least one shared capability, and the shared capability is a capability whose quantity does not increase with the quantity of air-interface slices.

In a possible design, the capability candidate set includes a first shared capability, and the first shared capability is a maximum control channel blind detection capability, and is used to indicate a maximum quantity B1 of control channel blind detections to be performed by the terminal device.

The capability indicated by using the capability configuration information includes a maximum quantity B2 of control channel blind detections to be performed by the terminal device in at least two air-interface slices, where B2 is less than or equal to B1.

According to a fifth aspect, an embodiment of this application provides a communications apparatus. The communications apparatus includes a processor, and the processor is coupled to a memory. The memory is configured to store instructions. The processor is configured to perform the method according to any one of the fourth aspect or the possible designs of the fourth aspect based on the instructions stored in the memory. Optionally, the communications apparatus may further include the memory. Optionally, the communications apparatus may further include a transceiver, configured to support the communications apparatus in sending and/or receiving information in the foregoing method. Optionally, the communications apparatus may be a terminal device, or may be an apparatus in a terminal device, for example, a chip or a chip system. The chip system includes at least one chip, and the chip system may further include another circuit structure and/or a discrete device.

According to a sixth aspect, an embodiment of this application provides a communications apparatus, configured to implement the method according to any one of the fourth aspect or the possible designs of the fourth aspect. The communications apparatus includes corresponding functional modules, for example, a processing unit and a communications unit, which are respectively configured to implement the steps in the foregoing method.

An embodiment of this application provides a computer program product. When a computer reads and executes the computer program product, the computer is enabled to perform the method according to any one of the foregoing possible designs.

An embodiment of this application provides a readable storage medium, including a program or instructions. When the program or the instructions are executed, a computer is enabled to perform the method according to any one of the foregoing possible designs.

An embodiment of this application provides a chip. The chip is connected to a memory, and is configured to: read and execute a software program stored in the memory, to implement the method according to any one of the foregoing possible designs.

An embodiment of this application provides a communications apparatus, including a processor. The processor is configured to: be coupled to a memory, and read and execute instructions in the memory, to implement the method according to any one of the foregoing aspects or the possible designs of any one of the foregoing aspects.

An embodiment of this application provides a communications system, including the communications apparatus according to the second aspect and the communications apparatus according to the fifth aspect.

DESCRIPTION OF EMBODIMENTS

The following describes the embodiments of this application in detail with reference to the accompanying drawings of this specification.

The embodiments of this application may be applied to various mobile communications systems, for example, a new radio (NR) system, a global system for mobile communications (GSM), a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), an evolved long term evolution (eLTE) system, a future communications system, and another communications system. Specifically, this is not limited herein.

The embodiments of this application may be applied to a plurality of possible communications scenarios. The following briefly describes several possible communications scenarios.

Figure 1:
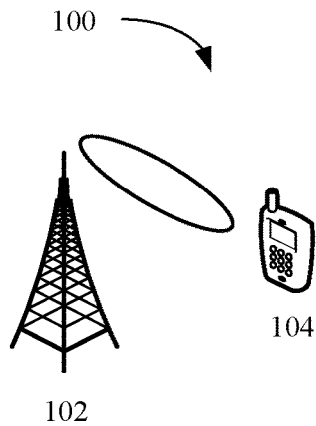
FIG. 1 is a schematic diagram of a cellular mobile communications scenario applicable to a capability configuration method, according to an embodiment of this application.

In an example, the foregoing communications scenario may be applied to a cellular mobile communications scenario. FIG. 1 is a schematic diagram of a cellular mobile communications scenario applicable to a communication method according to an embodiment of this application. As shown in FIG. 1, the communications system 100 includes a first device 102 and a second device 104. The first device 102 and the second device 104 may communicate with each other by using a communications protocol such as NR. This is not limited in this embodiment of this application. It should be understood that FIG. 1 is merely a schematic architectural diagram of the communications system. A quantity of network devices and a quantity of terminal devices in the communications system are not limited in this embodiment of this application. When the communications scenario is a cellular mobile communications scenario, the first device may be a terminal device 104, and the second device may be a network device 102.

Figure 2:
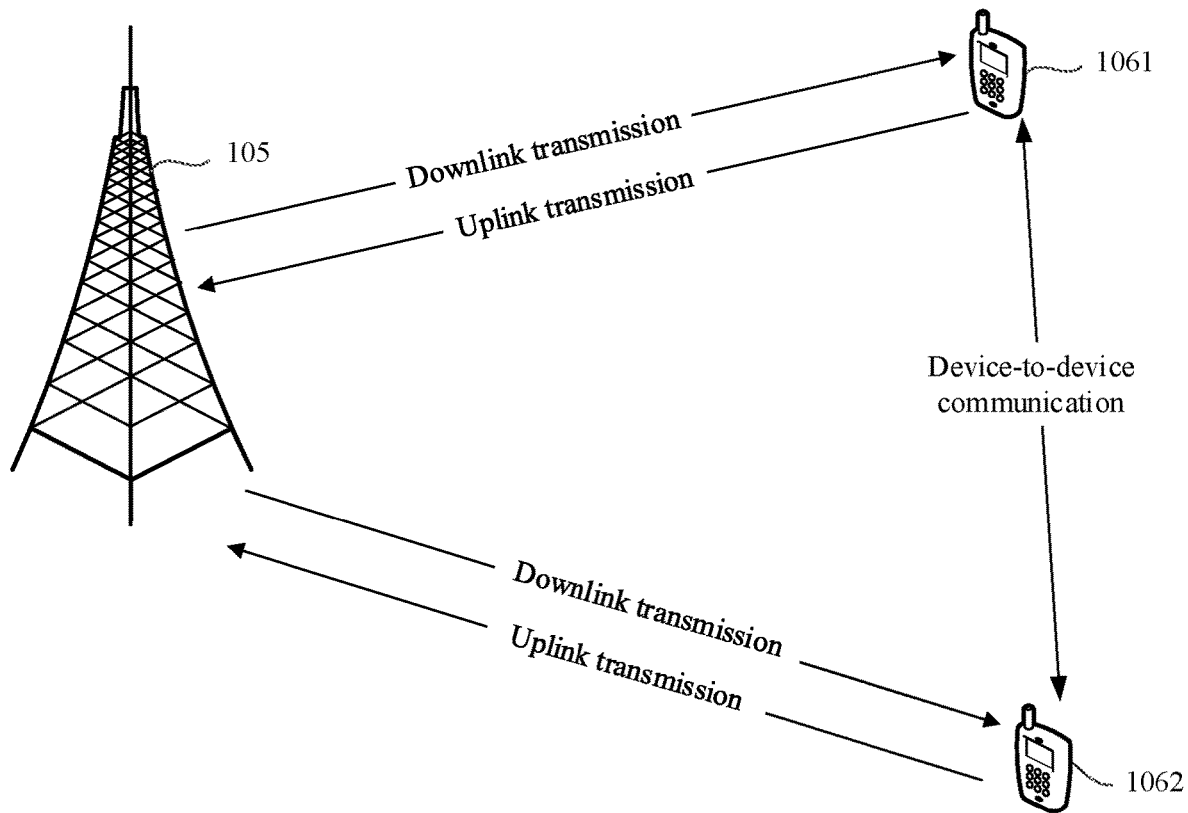
FIG. 2 is a schematic diagram of a sidelink communications scenario applicable to a capability configuration method, according to an embodiment of this application.

In another example, the foregoing communications scenario may be applied to sidelink communications. FIG. 2 is a schematic diagram of a sidelink communications scenario applicable to a communication method according to an embodiment of this application. As shown in FIG. 2, the communications scenario may include a second device 105, a first device 1061, and a first device 1062. It should be noted that FIG. 2 is merely an example for description, and there may be another first device in FIG. 2. Data may be transmitted between the second device 105 and each of the first device 1061 and the first device 1062 by using an air interface resource, and data may be transmitted between the first device 1061 and the first device 1062 by using a sidelink resource. The first device 1061 and the first device 1062 may be terminal devices, and the second device may be a network device. In FIG. 2, uplink transmission is used as an example. A data channel for performing uplink data transmission between the second device 105 and the first device 1061 or the first device 1062 may be carried on an uplink (UL) carrier (for example, a first UL carrier). A data channel for performing data transmission between the first device 1061 and the first device 1062 may be carried on a sidelink (SL) carrier. In an example, the SL carrier may be a UL carrier (for example, a second UL carrier). The first UL carrier and the second UL carrier may be a same carrier.

In this embodiment of this application, the terminal device is a device with a wireless sending/receiving function or a chip that may be disposed in the device. The device with the wireless sending/receiving function may also be referred to as user equipment (UE), an access terminal, a subscriber unit, a subscriber station, a mobile station, a remote station, a remote terminal, a mobile device, a user terminal, a user agent or a user apparatus. In actual application, the terminal device in this embodiment of this application may be a mobile phone, a tablet computer, a computer with a wireless sending/receiving function, a virtual reality (VR) terminal, an augmented reality (AR) terminal, a wireless terminal in industrial control, a self-driving wireless terminal, a wireless terminal in a remote medical application, a wireless terminal in a smart grid, a wireless terminal in a transportation safety application, a wireless terminal in a smart city, a wireless terminal in a smart home, or the like. An application scenario is not limited in this embodiment of this application. In this application, the device with the wireless sending/receiving function and the chip that may be disposed in the device are collectively referred to as the terminal device.

In this embodiment of this application, the network device may be a radio access device in various standards, for example, an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, or a transmission point (transmission and reception point, TRP; or transmission point, TP), may be a gNB or a transmission point (TRP or TP) in a 5G (NR) system, or one antenna panel or one group of antenna panels (including a plurality of antenna panels) of a base station in a 5G system, or may be a network node forming a gNB or a transmission point, for example, a baseband unit (BBU) or a DU in a centralized unit-distributed unit (CU-DU) architecture.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 3:
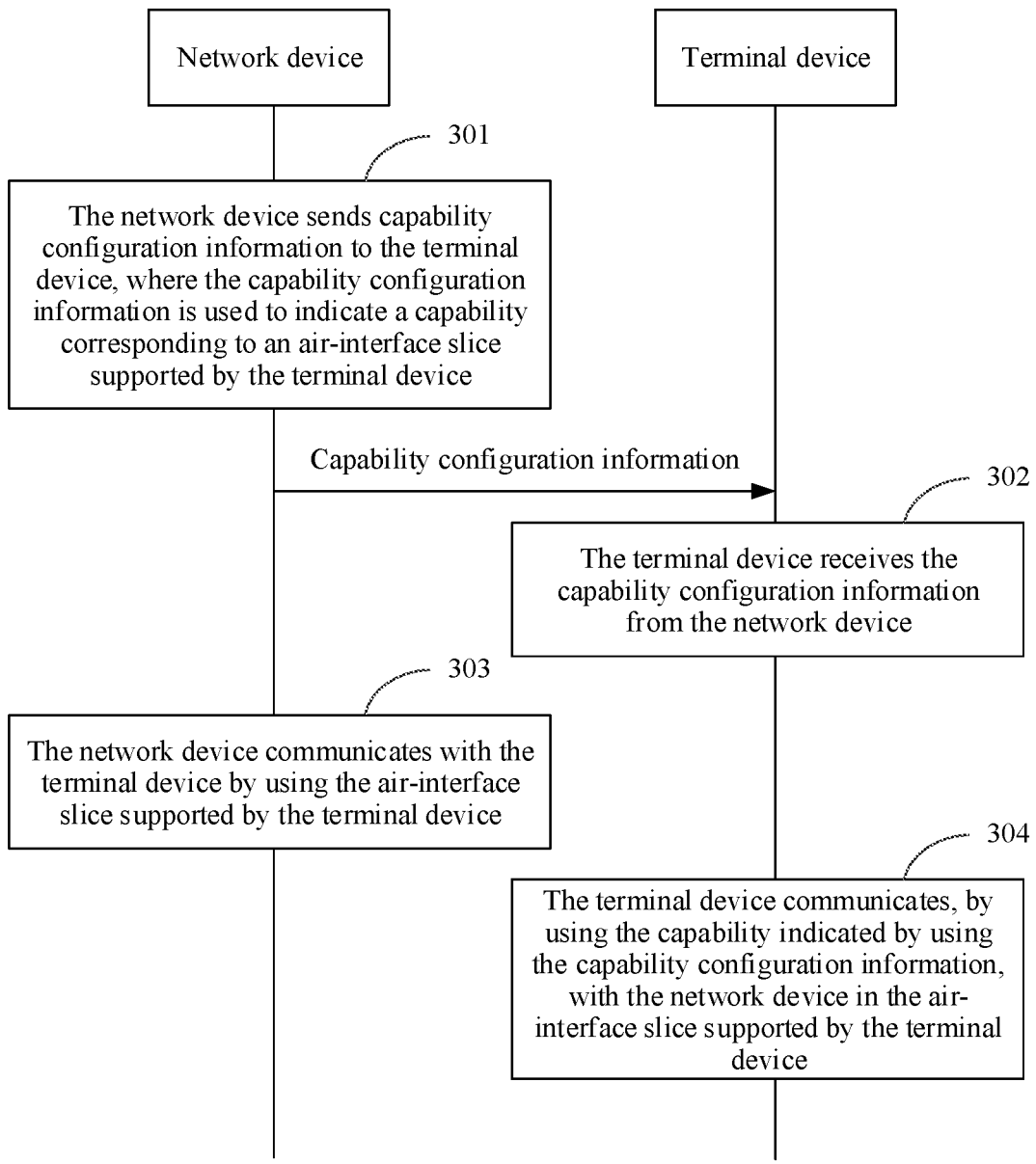
FIG. 3 is a schematic flowchart of a capability configuration method, according to an embodiment of this application.

FIG. 3 is a schematic flowchart of a capability configuration method according to an embodiment of this application. The method includes the following steps.

Step 301: A network device sends capability configuration information to a terminal device, where the capability configuration information is used to indicate a capability corresponding to an air-interface slice supported by the terminal device.

For example, in this embodiment of this application, the capability corresponding to the air-interface slice supported by the terminal device is determined from a capability candidate set reported by the terminal device. In this implementation, before the network device sends the capability configuration information, the terminal device may report the capability candidate set of the terminal device to the network device.

Certainly, the terminal device may not need to report the capability candidate set of the terminal device. The network device and the terminal device may agree on the capability candidate set in advance. In this case, the capability corresponding to the air-interface slice supported by the terminal device is determined from the pre-agreed capability candidate set.

It should be noted that an air-interface slice may be used to carry a network slice, and a transport block (TB) corresponding to a specific service is carried in a specific air-interface slice. The air-interface slice may refer to a different serving cell, a different carrier, a different bandwidth part (BWP), a different layer, or a different antenna port.

It should be understood that the serving cell is described relative to a higher layer from a perspective of resource management, mobility management, or a service unit. A coverage area of each network device may be divided into one or more serving cells, and the serving cell may be considered to include a specific frequency domain resource, that is, one serving cell may include one or more carriers. The concept of carrier is described from a perspective of signal generation at a physical layer. One carrier is defined by one or more frequencies, corresponds to a continuous or discontinuous spectrum, and is used to carry communication data between a network device and a terminal. A downlink carrier may be used for downlink transmission, and an uplink carrier may be used for uplink transmission.

It should be understood that the BWP may also be referred to as bandwidth, a carrier bandwidth part, subband bandwidth, narrowband bandwidth, or another name. A name is not limited in this application, and no distinction is made between different names in the following embodiments. A plurality of uplink bandwidth parts may be configured on one uplink carrier, and a plurality of downlink bandwidth parts may be configured on one downlink carrier. Alternatively, a plurality of bandwidth parts in this embodiment of this application may be located in a same cell or on a same carrier, or may be located in different cells or on different carriers.

For example, one BWP may include K (K>0) consecutive subcarriers. Alternatively, one BWP is a frequency domain resource on which N non-overlapping consecutive resource blocks (RB) are located. A subcarrier spacing of the RB may be 15 kHz, 30 kHz, 60 kHz, 120 kHz, 240 kHz, 480 kHz, or another value. Alternatively, one BWP is a frequency domain resource on which M non-overlapping consecutive resource block groups (resource block group, RBG) are located. One RBG includes P consecutive RBs. A subcarrier spacing of the RB may be 15 kHz, 30 kHz, 60 kHz, 120 kHz, 240 kHz, 480 kHz, or another value, for example, an integer multiple of 2.

It should be understood that a TB is referred to as a codeword after channel coding processing is performed. A quantity of codewords is different from a quantity of transmit antennas, and codewords need to be mapped to different antennas. Therefore, a concept of layer is introduced. A quantity of layers is equal to a rank of a channel matrix, namely, a quantity of data streams that can be independently transmitted in parallel. A concept of antenna port is defined from a perspective of a receive end (a terminal device performs downlink receiving, and a network device performs uplink receiving). A port is an independent antenna channel for the receive end.

Step 302: The terminal device receives the capability configuration information from the network device.

Step 303: The network device communicates with the terminal device by using the air-interface slice supported by the terminal device.

Step 304: The terminal device communicates, by using the capability indicated by using the capability configuration information, with the network device in the air-interface slice supported by the terminal device.

According to the method, the network device configures, for the terminal device by using the capability configuration information, the capability that matches the air-interface slice supported by the terminal device, to ensure that the network device and the terminal device have a common understanding of the capability in the air-interface slice supported by the terminal device. In this way, a problem of how the network device determines a capability of the terminal device in each air-interface slice when the terminal device supports a plurality of air-interface slices is resolved.

In this embodiment of this application, a capability in the capability candidate set includes but is not limited to one or more of the following:

a quantity of radio frequency channels that may be used by the terminal device for communication;
a quantity of TBs to be processed in parallel;
a quantity of code blocks (CB) to be processed in parallel;
a quantity of fast Fourier transforms (FFT) to be used by the terminal device to demodulate the TB;
a quantity of FFTs to be used by the terminal device to demodulate the CB;
a quantity of pieces of downlink control information (DCI) to be supported by the terminal device;
a maximum quantity of control channel blind detections;
a maximum quantity of control channel estimations;
a maximum quantity of hybrid automatic repeat request (HARQ) entities to be supported by the terminal device; and
a quantity of CQIs to be fed back by the terminal device.

Certainly, the foregoing is merely an example, and the capability candidate set may further include another capability. No examples are provided one by one herein for description.

In this embodiment of this application, the terminal device may have two types of capabilities: a unique capability and a shared capability. The unique capability may be a capability whose quantity increases with a quantity of air-interface slices supported by the terminal device. The unique capability is constrained by a capability constraint in each air-interface slice and a total capability constraint. Alternatively, from another perspective, the unique capability is a capability that covers only one air-interface slice. Correspondingly, the shared capability may be a capability whose quantity does not increase with the quantity of air-interface slices supported by the terminal device, and the shared capability is allocated in different air-interface slices. Alternatively, from another perspective, the shared capability is a capability that can cover a plurality of (at least two) air-interface slices.

With reference to the foregoing description, in this embodiment of this application, the capability candidate set includes at least one unique capability, at least one shared capability, or at least one unique capability and at least one shared capability.

In this embodiment of this application, for the terminal device, the network device may configure which capabilities are shared capabilities and which capabilities are unique capabilities in a given multi-slice implementation. For example, in a scenario in which the terminal device supports a plurality of air-interface slices by using a plurality of carriers or a plurality of carrier bandwidth parts (BWP), one TB may be mapped to the plurality of air-interface slices, and the one TB may be divided into a plurality of CBs. In this case, the quantity of TBs to be simultaneously transmitted by the terminal device may be used as the shared capability to match the plurality of air-interface slices. Correspondingly, the network device may configure the CBs included in the TB to be respectively mapped to the plurality of air-interface slices. In this configuration, one TB is mapped to the plurality of air-interface slices. Therefore, overheads of control signaling can be reduced, and a transmission diversity gain of the TB can be increased, thereby improving transmission robustness of the TB.

For example, in a scenario in which the terminal device supports a plurality of air-interface slices by using a plurality of carriers or a plurality of carrier BWPs, information in the plurality of air-interface slices may be modulated into a relatively long orthogonal frequency division multiplexing (OFDM) baseband signal by using an FFT. In this case, the quantity of FFTs to be used by the terminal device may be used as the shared capability to match the plurality of air-interface slices. Correspondingly, the network device may configure a quantity of FFT points in the plurality of air-interface slices, which corresponds to a quantity of frequency domain resources (for example, subcarriers) allocated in the plurality of air-interface slices. In this configuration, the information in the plurality of air-interface slices is modulated into the relatively long OFDM baseband signal by using the FFT. Therefore, a peak-to-average power ratio (PAPR) of a signal can be reduced, spectrum spread interference and in-band signal distortion can be reduced, and resolution of a time-domain signal obtained through conversion can be improved. This facilitates suppression of noise interference, and therefore better transmission quality is obtained.

For example, when the terminal device supports a plurality of air-interface slices in an intra-band contiguous carrier aggregation (CA) manner, the network device may use the quantity of radio frequency channels to be used by the terminal device as the shared capability to match the plurality of air-interface slices. In this case, one radio frequency channel may be configured for the terminal device for use. In this configuration, a radio frequency structure of the terminal device may be simplified (for example, only one power amplifier is used). When active BWPs of the terminal device on at least two carriers are relatively large, it is more advantageous to save energy for the terminal device. It should be noted that in this scenario, the network device may configure, based on an actual situation, the quantity of radio frequency channels to be used by the terminal device. For example, when the terminal device needs to further save energy on each carrier, that is, operating bandwidth of the terminal device falls back to a default BWP, the network device may configure two radio frequency channels for the terminal device for use.

For another example, in a scenario in which the terminal device supports a plurality of air-interface slices by using a plurality of BWPs, the network device may configure at least two radio frequency channels for the terminal device for use. In this way, a radio frequency switching latency caused by different subcarrier spacings corresponding to a control channel and a data channel can be avoided, and a throughput of the terminal device can be improved. On the contrary, in this scenario, when the terminal device uses only one radio frequency channel, a plurality of symbols between an end location of the control channel and a start location of the data channel cannot be used due to the switching delay, and consequently the throughput of the terminal device is affected.

In this embodiment of this application, the capability indicated by the network device by using the capability configuration information is the capability that matches the air-interface slice supported by the terminal device. The capability that matches the air-interface slice supported by the terminal device may be a capability that can meet a requirement of the air-interface slice.

For example, the capability candidate set of the terminal device includes a first unique capability. The first unique capability is physical uplink shared channel (PUSCH) preparation duration T1 and uplink BWP switching duration T2 that correspond to the terminal device on a first radio frequency channel. PUSCH timing duration required by the air-interface slice supported by the terminal device is T3. When T3 is greater than or equal to a maximum value between T1 and T2, the capability indicated by using the capability configuration information includes the first unique capability. Correspondingly, when T3 is less than the maximum value between T1 and T2, the capability indicated by using the capability configuration information does not include the first unique capability. The PUSCH timing duration may be timing duration between a last symbol of a physical downlink control channel (PDCCH) that carries DCI for scheduling a PUSCH to a start symbol of a cyclic prefix (CP) of the PUSCH. The PUSCH timing duration is equal to a maximum value between the PUSCH preparation duration and the uplink BWP switching duration. The PUSCH preparation duration may be duration required by the terminal device to map, to the PUSCH, information that needs to be transmitted. The uplink BWP switching duration may be duration required by the terminal device to switch between two uplink BWPs. The duration may be in a unit of an OFDM symbol, a second, a minute, or the like. This is not limited in this embodiment of this application. For example, for the terminal device on a radio frequency channel 1, the PUSCH preparation duration is five OFDM symbols, and the uplink BWP switching duration is 10 OFDM symbols. For the terminal device on a radio frequency channel 2, the PUSCH preparation duration is 10 OFDM symbols, and the uplink BWP switching duration is 15 OFDM symbols. The PUSCH timing duration required by the air-interface slice supported by the terminal device is 12 OFDM symbols. For the terminal device on the radio frequency channel 1, the maximum value between the PUSCH preparation duration and the uplink BWP switching duration is 10 OFDM symbols, and therefore the PUSCH timing duration, of 12 OFDM symbols, required by the air-interface slice supported by the terminal device is met. However, for the terminal device on the radio frequency channel 2, the maximum value between the PUSCH preparation duration and the uplink BWP switching duration is 15 OFDM symbols, and therefore the PUSCH timing duration, of 12 OFDM symbols, required by the air-interface slice supported by the terminal device is not met. Therefore, the network device may indicate, by using the capability configuration information, the terminal device to perform sending and receiving in the air-interface slice by using the radio frequency channel 1.

For another example, the capability candidate set of the terminal device includes a first shared capability. The first shared capability is a maximum control channel blind detection capability, and is used to indicate a maximum quantity B1 of control channel blind detections to be performed by the terminal device. The capability indicated by using the capability indication information includes a maximum quantity B2 of control channel blind detections to be performed by the terminal device in at least two air-interface slices, where B2 is less than or equal to B1. A maximum quantity of control channel blind detections to be performed by the terminal device in an air-interface slice may be a quantity that is of blind detections to be performed by the terminal device and that corresponds to a search space set in a BWP of the air-interface slice. For example, the terminal device supports an air-interface slice 1 and an air-interface slice 2, a BWP 1 is configured in the air-interface slice 1, and a BWP 2 is configured in the air-interface slice 2. A search space set 0 and a search space set 1 are configured in the BWP 1, and respectively correspond to a maximum quantity of control channel blind detections of 15 and a maximum quantity of control channel blind detections of 20. A search space set 2 and a search space set 3 are configured in the BWP 2, and respectively correspond to a maximum quantity of control channel blind detections of 10 and a maximum quantity of control channel blind detections of 15. It is assumed that the maximum quantity of control channel blind detections to be performed by the terminal device is 44, and is to be allocated in the search space sets 0 to 3. According to a method in a conventional technology, the terminal device sequentially determines whether blind detection can be performed in the search space sets 0 to 3, and finally determines the search space set 0 and the search space set 1. A sum of the corresponding maximum quantities of control channel blind detections is 35. Therefore, the terminal device performs blind detection only in the search space set 0 and the search space set 1. In this embodiment of this application, the network device may configure a maximum quantity of blind detections to be performed by the terminal device in the BWP 1 to be 20, and a maximum quantity of blind detections to be performed by the terminal device in the BWP 2 to be 20. In this case, because the maximum quantity of blind detections in the BWP 1 is 20, the terminal device performs blind detection only in the search space set 0, and no longer performs blind detection in the search space set 1. Similarly, because the maximum quantity of blind detections in the BWP 2 is 20, the terminal device performs blind detection only in the search space set 2, and no longer performs blind detection in the search space set 3.

According to the method, the capability of the terminal device matches the requirement of the air-interface slice supported by the terminal device, to ensure that the terminal device and the network device have a common understanding of a capability in a given air-interface slice.

Further, optionally, in this embodiment of this application, a capability of the terminal device may be configured as the unique capability or the shared capability in a different scenario. That is, for a different configuration, the shared capability and the unique capability may be mutually converted.

For example, when the terminal device supports at least two air-interface slices in the intra-band contiguous carrier aggregation manner, the network device may configure one or more of the following shared capabilities: the quantity of radio frequency channels to be used, the quantity of FFTs to be used by the terminal device to demodulate the TB, and the quantity of FFTs to be used by the terminal device to demodulate the CB.

Correspondingly, in this scenario, the network device may configure one or more of the following unique capabilities: the quantity of TBs to be processed in parallel, the quantity of CBs to be processed in parallel, the quantity of pieces of DCI to be supported, the maximum quantity of control channel blind detections, the maximum quantity of control channel estimations, the maximum quantity of HARQ entities to be supported by the terminal device, and the quantity of CQIs to be fed back by the terminal device.

Figure 4:
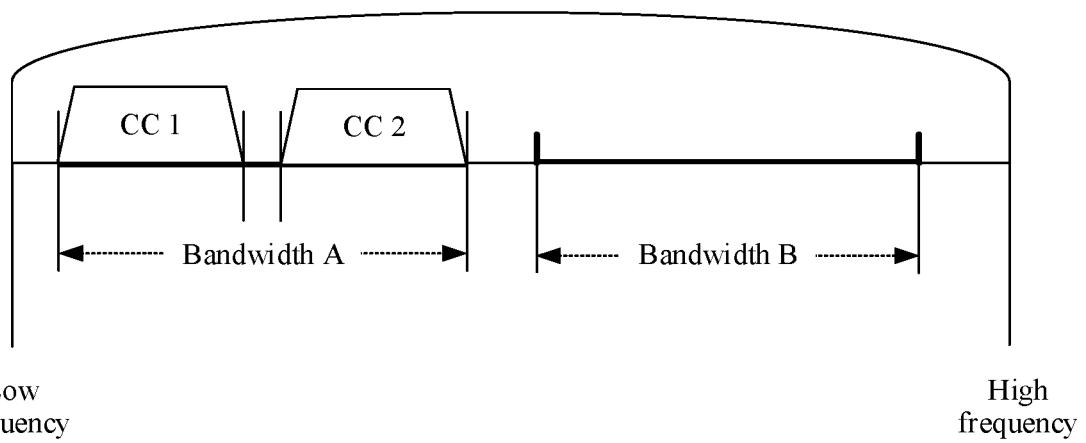
FIG. 4 is a schematic diagram of intra-band contiguous carrier aggregation, according to an embodiment of this application.

For example, as shown in FIG. 4, the terminal device occupies two component carriers (CC), namely, a CC 1 and a CC 2, in bandwidth A in a carrier aggregation manner. The terminal device further supports two air-interface slices in the intra-band contiguous carrier aggregation manner. Each air-interface slice corresponds to one component carrier. In this case, the shared capability of the terminal device may include at least one of the following: the terminal device may use one radio frequency channel for receiving and sending; if subcarrier spacings used for data transmission on the two component carriers are the same, the terminal device may use one FFT to demodulate two TBs; and if the subcarrier spacings used for data transmission on the two component carriers are the same, the terminal device may use one FFT to demodulate two CBs.

Correspondingly, the unique capability of the terminal device may include at least one of the following:

the quantity of pieces of DCI to be supported by the terminal device is 2;

the maximum quantity of blind control channel detections to be performed by the terminal device is 2*44=88 in an example in which a control channel corresponding to each of the two component carriers is 15 kHz;

the maximum quantity of control channel estimations to be performed by the terminal device is 2*56=112;

the terminal device needs to process two TBs in parallel;

the terminal device needs to process two CBs in parallel;

the maximum quantity of HARQ entities to be supported by the terminal device is 2; and he quantity of CQIs to be fed back by the terminal device is 2.

When the terminal device supports at least two air-interface slices in a multiple-input multiple-output (MIMO) manner, the network device may configure one or more of the following shared capabilities: the quantity of radio frequency channels to be used, the quantity of pieces of DCI to be supported, the maximum quantity of control channel blind detections, the maximum quantity of control channel estimations, and the maximum quantity of HARQ entities to be supported by the terminal device.

Correspondingly, in this scenario, the network device may configure one or more of the following unique capabilities: the quantity of TBs to be processed in parallel, the quantity of CBs to be processed in parallel, the quantity of FFTs to be used to demodulate the transport block TB, the quantity of FFTs to be used to demodulate the CB, and the quantity of CQIs to be fed back.

Figure 5:
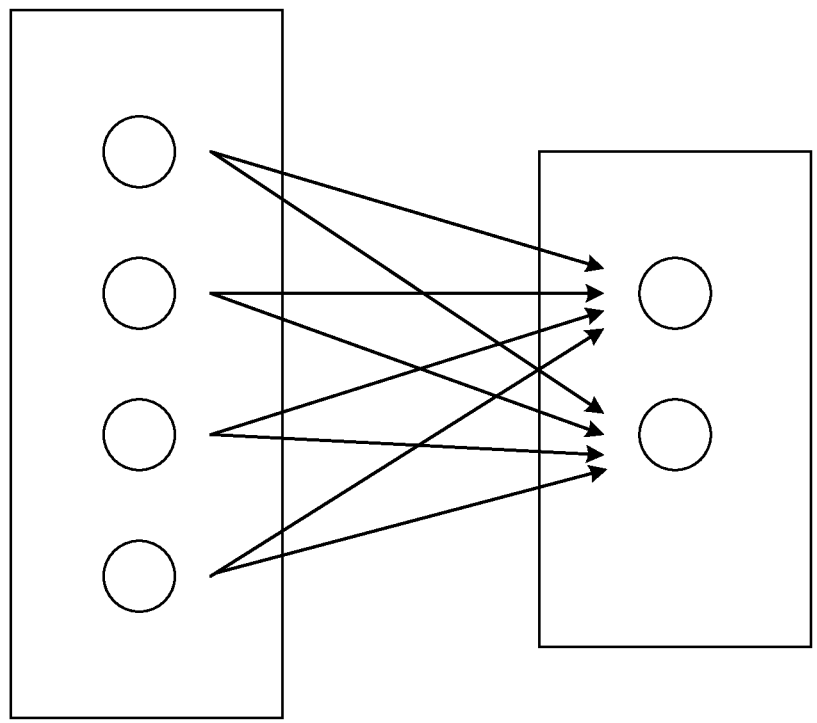
FIG. 5 is a schematic diagram of a multiple-input multiple-output system, according to an embodiment of this application.

For example, as shown in FIG. 5, when the terminal device supports two air-interface slices in a 4×2 (namely, four transmit antennas x two receive antennas) MIMO manner, the shared capability of the terminal device may include at least one of the following:

the terminal device may use one radio frequency channel for receiving and sending;

the quantity of pieces of DCI to be supported by the terminal device is 1;
the maximum quantity of blind control channel detections to be performed by the terminal device is 44 in an example in which a control channel corresponding to each of component carriers on which the terminal device is located is 15 kHz;
the maximum quantity of control channel estimations to be performed by the terminal device is 56; and
the maximum quantity of HARQ entities to be supported by the terminal device is 1.

Correspondingly, the unique capability of the terminal device may include at least one of the following:
the terminal device needs to use two FFTs to demodulate two TBs;
the terminal device needs to use two FFTs to demodulate two CBs;
the terminal device needs to process two TBs in parallel;
the terminal device needs to process two CBs in parallel; and
the quantity of CQIs to be fed back by the terminal device is 2.

When the terminal device supports at least two air-interface slices by using overlapping BWPs, the network device may configure one or more of the following shared capabilities: the quantity of radio frequency channels to be used, the maximum quantity of control channel blind detections, the maximum quantity of control blind estimations, the maximum quantity of HARQ entities, and the quantity of CQIs to be fed back.

Correspondingly, in this scenario, the network device may configure one or more of the following unique capabilities: the quantity of pieces of DCI to be supported, the quantity of TBs to be processed in parallel, the quantity of CBs to be processed in parallel, the quantity of FFTs to be used to demodulate the TB, and the quantity of FFTs to be used to demodulate the CB.

Figure 6:
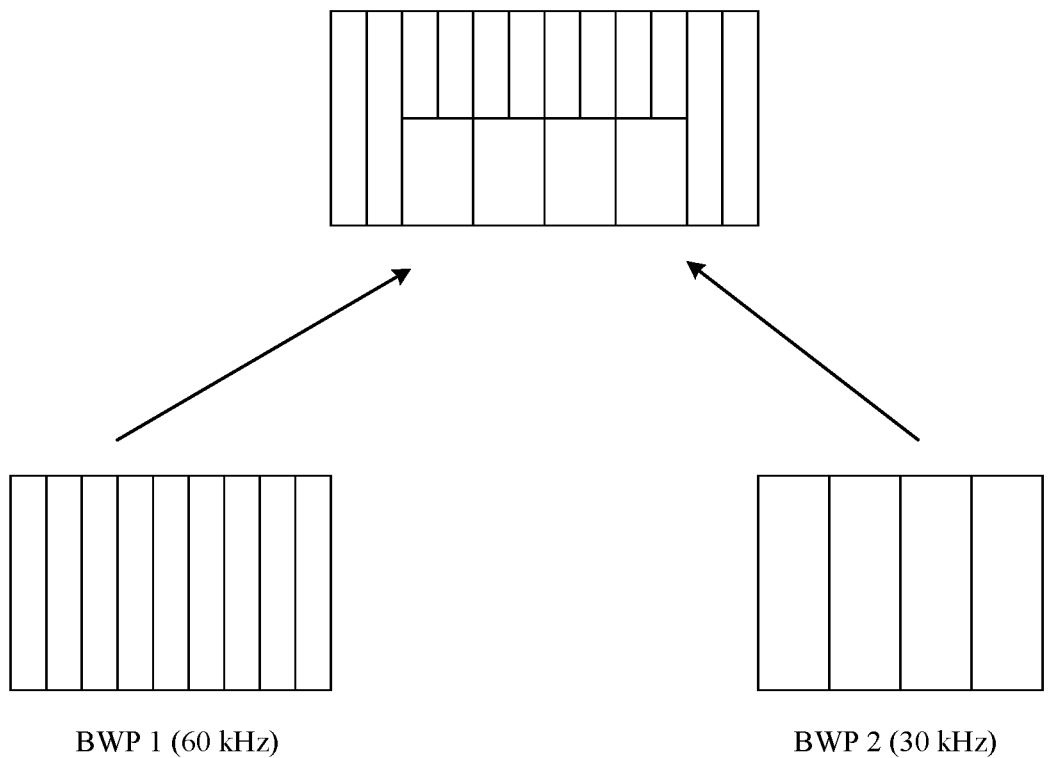
FIG. 6 is a schematic diagram of overlapping BWPs, according to an embodiment of this application.

For example, as shown in FIG. 6, the terminal device supports two air-interface slices by using two overlapping BWPs. A subcarrier spacing of a BWP 1 in the two overlapping BWPs is 60 kHz, and a subcarrier spacing of a BWP 2 in the two overlapping BWPs is 30 kHz. A data channel on the BWP 2 is scheduled across BWPs by using a control channel on the BWP 1. In this scenario, the shared capability of the terminal device may include at least one of the following:
the terminal device may use one radio frequency channel for receiving and sending;
the maximum quantity of control channel blind detections to be performed by the terminal device is 44;
the maximum quantity of control channel estimations to be performed by the terminal device is 56;
the maximum quantity of HARQ entities to be supported by the terminal device is 1; and
the quantity of CQIs to be fed back by the terminal device is 2.

Correspondingly, the unique capability of the terminal device may include at least one of the following:
the quantity of pieces of DCI to be supported by the terminal device is 2;
the terminal device needs to use two FFTs to demodulate two TBs;
the terminal device needs to use two FFTs to demodulate two CBs;
the terminal device needs to process two TBs in parallel; and
the terminal device needs to process two CBs in parallel.

It may be learned from the foregoing examples that the capability of the terminal device may be configured as the unique capability or the shared capability in a different scenario. Certainly, the foregoing is merely an example, and another capability may be further configured. No examples are provided one by one herein for description.

In the foregoing embodiments provided in this application, various solutions of the communication method provided in the embodiments of this application are separately described from perspectives of each network element and interaction between network elements. It may be understood that to implement the foregoing functions, the network elements and devices, for example, the radio access network device, the access and mobility management function network element, the user equipment, the data management function network element, and the network slice selection function network element, include corresponding hardware structures and/or software modules for executing the functions. A person skilled in the art should easily be aware that, in combination with units and algorithm steps of the examples described in the embodiments disclosed in this specification, this application may be implemented by hardware or a combination of hardware and computer software.

Figure 7:
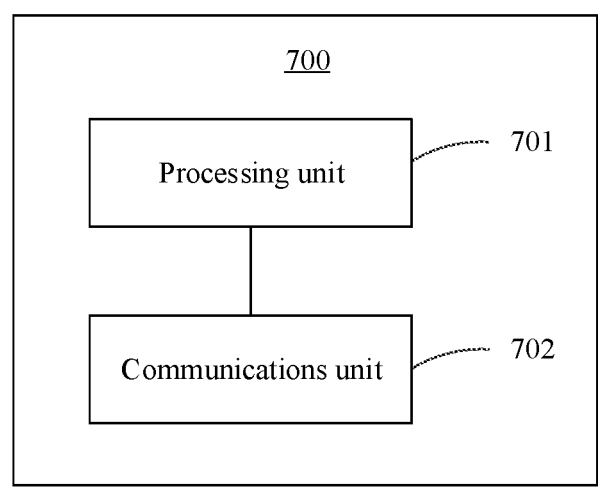
FIG. 7 is a schematic structural diagram of a communications apparatus, according to an embodiment of this application.

In a case of an integrated unit, FIG. 7 is a schematic structural diagram of a communications apparatus according to an embodiment of this application. The communications apparatus 700 may exist in a form of software. The communications apparatus may be configured to perform the actions of the network device or the terminal device in the foregoing method embodiments. The communications apparatus 700 includes a processing unit 701 and a communications unit 702. The processing unit 701 is configured to: control and manage an action of the communications apparatus 700. The communications unit 702 is configured to support the communications apparatus 700 in communicating with another network entity. The communications apparatus 700 may further include other units, which are not described herein one by one.

The communications apparatus 700 may be the network device in any one of the foregoing embodiments, or may be a semiconductor chip disposed in the network device. In this embodiment of this application, when the communications apparatus 700 performs the actions of the network device in the procedure shown in FIG. 3, the processing unit 701 and the communications unit 702 respectively perform the following steps:

The communications unit 702 is configured to send capability configuration information to a terminal device. The capability configuration information is used to indicate a capability corresponding to an air-interface slice supported by the terminal device, and the capability corresponding to the air-interface slice supported by the terminal device is determined from a capability candidate set reported by the terminal device.

The processing unit 701 is configured to communicate with the terminal device by using the air-interface slice supported by the terminal device.

In a possible design, the capability candidate set includes at least one unique capability, and the unique capability is a capability whose quantity increases with a quantity of air-interface slices.

In a possible design, the capability candidate set includes a first unique capability, the first unique capability is physical uplink shared channel PUSCH preparation duration T1 and uplink bandwidth part BWP switching duration T2 that correspond to the terminal device on a first radio frequency channel, and PUSCH timing duration required by the air-interface slice supported by the terminal device is T3.

When T3 is greater than or equal to a maximum value between T1 and T2, the capability indicated by using the capability configuration information includes the first unique capability.

In a possible design, the capability candidate set includes at least one shared capability, and the shared capability is a capability whose quantity does not increase with the quantity of air-interface slices.

In a possible design, the capability candidate set includes a first shared capability, and the first shared capability is a maximum control channel blind detection capability, and is used to indicate a maximum quantity B1 of control channel blind detections to be performed by the terminal device.

The capability indicated by using the capability configuration information includes a maximum quantity B2 of control channel blind detections to be performed by the terminal device in at least two air-interface slices, where B2 is less than or equal to B1.

Alternatively, the communications apparatus 700 may be the terminal device in any one of the foregoing embodiments, or may be a semiconductor chip disposed in the terminal device. The processing unit 701 may support the communications apparatus 700 in performing the actions of the network device in the foregoing method embodiments. Alternatively, the processing unit 701 mainly performs an internal action of the network device in the method examples. The communications unit 702 may support the communications apparatus 700 in communicating with a terminal device.

Specifically, in an embodiment, the communications unit 702 is configured to receive capability configuration information from a network device. The capability configuration information is used to indicate a capability corresponding to an air-interface slice supported by the terminal device, and the capability corresponding to the air-interface slice supported by the terminal device is determined from a capability candidate set reported by the terminal device.

The processing unit 701 is configured to communicate, by using the capability indicated by using the capability configuration information, with the network device in the air-interface slice supported by the terminal device.

In a possible design, the capability candidate set includes at least one unique capability, and the unique capability is a capability whose quantity increases with a quantity of air-interface slices.

In a possible design, the capability candidate set includes a first unique capability, the first unique capability is physical uplink shared channel PUSCH preparation duration T1 and uplink bandwidth part BWP switching duration T2 that correspond to the terminal device on a first radio frequency channel, and a sum of PUSCH timing duration required by air-interface slices supported by the terminal device is T3.

When T3 is greater than or equal to a maximum value between T1 and T2, the capability indicated by using the capability configuration information includes the first unique capability.

In a possible design, the capability candidate set includes at least one shared capability, and the shared capability is a capability whose quantity does not increase with the quantity of air-interface slices.

In a possible design, the capability candidate set includes a first shared capability, and the first shared capability is a maximum control channel blind detection capability, and is used to indicate a maximum quantity B1 of control channel blind detections to be performed by the terminal device.

The capability indicated by using the capability configuration information includes a maximum quantity B2 of control channel blind detections to be performed by the terminal device in at least two air-interface slices, where B2 is less than or equal to B1.

Figure 8:
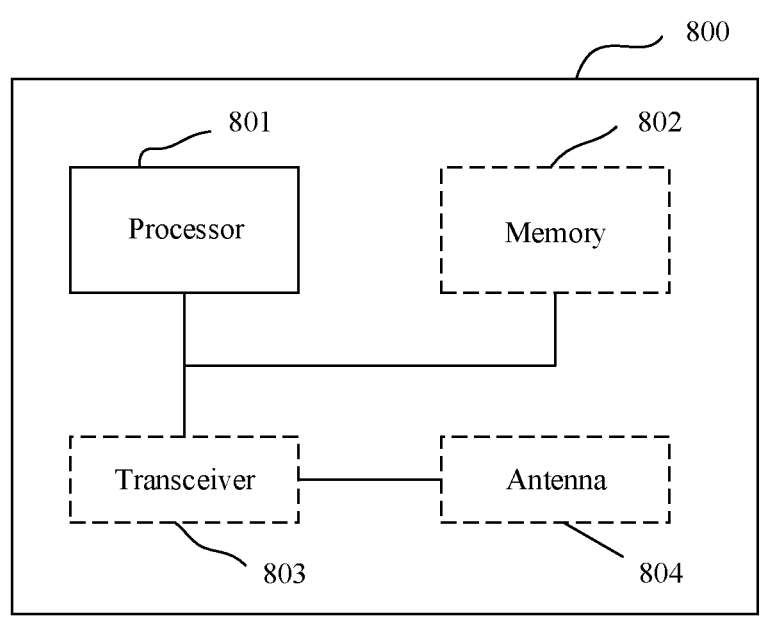
FIG. 8 is a schematic structural diagram of a communications apparatus, according to an embodiment of this application.

FIG. 8 is a schematic structural diagram of a communications apparatus. The communications apparatus shown in FIG. 8 may be an implementation of a hardware circuit of the communications apparatus shown in FIG. 7. The communications apparatus may be configured to implement the functions of the network device or the terminal device in the foregoing method. For details, refer to the description in the foregoing method embodiments. As shown in FIG. 8, the communications apparatus 800 includes a processor 801, a memory 802, a transceiver 803, an antenna 804, and the like. The processor 801 is mainly configured to: process a communications protocol and communication data, control the entire wireless communications apparatus, execute a software program, and process data of the software program. For example, the processor 801 is configured to support the wireless communications apparatus in performing the action described in the foregoing method embodiments. The memory 802 is mainly configured to store the software program and the data. The transceiver 803 is mainly configured to: perform a conversion between a baseband signal and a radio frequency signal, and process the radio frequency signal. The antenna 804 is mainly configured to receive/send a radio frequency signal in an electromagnetic wave form.

The communications apparatus 800 may be configured to implement the method that corresponds to the communications device and that is described in the foregoing method embodiments. For details, refer to the description in the foregoing method embodiments. Details are not described herein.

The processor 801 in the communications apparatus 800 may also be referred to as a processing unit, and may implement a specific control function. The processor 801 may be a general-purpose processor, a dedicated processor, or the like. For example, the processor 801 may be a baseband processor or a central processing unit. The baseband processor may be configured to process a communications protocol and communication data. The central processing unit may be configured to: control the communications apparatus (for example, a base station, a baseband chip, a distributed unit (distributed unit, DU), or a centralized unit (centralized unit, CU)), execute a software program, and process data of the software program.

In an optional design, the processor 801 may also store instructions and/or data. The instructions and/or the data may be run by the processor, to enable the communications apparatus 800 to perform the method that corresponds to the communications device and that is described in the foregoing method embodiments.

In an optional design, the processor 801 may include a transceiver unit, configured to implement receiving and sending functions. For example, the transceiver unit may be a transceiver circuit or an interface. Circuits or interfaces configured to implement the receiving and sending functions may be separated or integrated.

Optionally, the communications apparatus 800 may include one or more memories 802. The one or more memories 802 may store instructions. The instructions may be run on the processor, to enable the communications apparatus 800 to perform the method described in the foregoing method embodiments. Optionally, the memory may further store data. Optionally, the processor may also store instructions and/or data. The processor and the memory may be separately disposed, or may be integrated. For example, the various correspondences described in the foregoing method embodiments may be stored in the memory or the processor.

Optionally, the transceiver 803 may be referred to as a transceiver unit, a transceiver, a transceiver circuit, a transceiver, or the like, and is configured to implement a sending/receiving function of the communications apparatus.

In a possible design, the communications apparatus 800 (for example, an integrated circuit, a wireless device, a circuit module, a network device, or a terminal) may include the processor 801 and the transceiver 803. The transceiver 803 sends scheduling information at a first time domain location, and sends or receives, at a second time domain location, data scheduled by using the scheduling information. The processor 801 determines the second time domain location based on an end location of the first time domain location and/or a capability of the terminal device.

The processor 801 and the transceiver 803 described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like. The processor and the transceiver may be manufactured by using various IC processing technologies, for example, a complementary metal-oxide-semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In the description of the foregoing embodiments, the communications apparatus is described by using the network device or the terminal device as an example. However, a scope of the communications apparatus described in this application is not limited thereto, and a structure of the communications apparatus may not be limited by FIG. 8. The communications apparatus may be an independent device or a part of a relatively large device. For example, the device may be:

(1) an independent integrated circuit IC, a chip, a chip system, or a chip subsystem;
(2) a set including one or more ICs, where optionally, the IC set may also include a storage component configured to store data and/or an instruction;
(3) an ASIC, for example, a modem (MSM);
(4) a module that can be built into another device;
(5) a receiver, a terminal, an intelligent terminal, a cellular phone, a wireless device, a handset, a mobile unit, a vehicle-mounted device, a network device, a cloud device, an artificial intelligence device, or the like; or
(6) another device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may alternatively be integrated into the processor. The processor and the storage medium may be arranged in an ASIC, and the ASIC may be arranged in the terminal device. Optionally, the processor and the storage medium may alternatively be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method performed by an apparatus, comprising:
receiving information reporting a capability candidate set of a terminal device from the terminal device;
sending capability configuration information to the terminal device, wherein the capability configuration information indicates a capability corresponding to an air-interface slice supported by the terminal device, and the capability corresponding to the air-interface slice supported by the terminal device is determined from the capability candidate set reported by the terminal device; and
communicating with the terminal device in the air-interface slice supported by the terminal devices,
wherein the capability candidate set comprises a first shared capability, the first shared capability is a maximum control channel blind detection capability, and the first shared capability indicates a maximum quantity, B1, of control channel blind detections to be performed by the terminal device; and
wherein the capability indicated by the capability indication information comprises a maximum quantity, B2, of control channel blind detections to be performed by the terminal device in at least two air-interface slices, wherein B2 is less than or equal to B1.

2. The method according to claim 1, wherein the capability candidate set comprises at least one unique capability, and the at least one unique capability includes a capability whose quantity increases with a quantity of air-interface slices.

3. The method according to claim 1, wherein the capability candidate set comprises a first unique capability, the first unique capability is a physical uplink shared channel (PUSCH) preparation duration, T1, and an uplink bandwidth part (BWP) switching duration, T2, that correspond to the terminal device on a first radio frequency channel, and the air-interface slice supported by the terminal device requires a PUSCH timing duration, T3; and
responsive to determining that T3 is greater than or equal to a maximum value between T1 and T2, the capability indicated by the capability configuration information comprises the first unique capability.

4. The method according to claim 1, wherein the capability candidate set comprises at least one shared capability, and the at least one shared capability is includes a capability whose quantity does not increase with the quantity of air-interface slices.

5. A method performed by an apparatus, comprising:
sending information reporting a capability candidate set of the apparatus to a network device;
receiving capability configuration information from the network device, wherein the capability configuration information indicates a capability corresponding to an air-interface slice supported by the apparatus, and the capability corresponding to the air-interface slice supported by the apparatus is determined from the capability candidate set reported by the apparatus; and
communicating, in accordance with the capability indicated by the capability configuration information, with the network device in the air-interface slice supported by the apparatus,
wherein the capability candidate set comprises a first shared capability, the first shared capability is a maximum control channel blind detection capability, and the first shared capability indicates a maximum quantity, B1, of control channel blind detections to be performed by the apparatus; and
wherein the capability indicated by the capability configuration information comprises a maximum quantity, B2, of control channel blind detections to be performed by the apparatus in at least two air-interface slices, wherein B2 is less than or equal to B1.

6. The method according to claim 5, wherein the capability candidate set comprises at least one unique capability, and the at least one unique capability includes a capability whose quantity increases with a quantity of air-interface slices.

7. The method according to claim 5, wherein the capability candidate set comprises a first unique capability, the first unique capability is a physical uplink shared channel (PUSCH) preparation duration, T1, and an uplink bandwidth part (BWP) switching duration, T2, that correspond to the apparatus on a first radio frequency channel, and air-interface slices supported by the apparatus require a sum of PUSCH timing duration, T3; and
responsive to determining that T3 is greater than or equal to a maximum value between T1 and T2, the capability indicated by the capability configuration information comprises the first unique capability.

8. The method according to claim 5, wherein the capability candidate set comprises at least one shared capability, and the at least one shared capability includes a capability whose quantity does not increase with the quantity of air-interface slices.

9. An apparatus, comprising:
at least one processor configured to:
receive information reporting a capability candidate set of a terminal device;
send capability configuration information to the terminal device, wherein the capability configuration information indicates a capability corresponding to an air-interface slice supported by the terminal device, and the capability corresponding to the air-interface slice supported by the terminal device is determined from the capability candidate set reported by the terminal device; and
communicate with the terminal device in the air-interface slice supported by the terminal devices,
wherein the capability candidate set comprises a first shared capability, the first shared capability is a maximum control channel blind detection capability, and the first shared capability indicates a maximum quantity, B1, of control channel blind detections to be performed by the terminal device; and
wherein the capability indicated by the capability indication information comprises a maximum quantity, B2, of control channel blind detections to be performed by the terminal device in at least two air-interface slices, wherein B2 is less than or equal to B1.

10. The apparatus according to claim 9, wherein the capability candidate set comprises at least one unique capability, and the at least one unique capability includes a capability whose quantity increases with a quantity of air-interface slices.

11. The apparatus according to claim 9, wherein the capability candidate set comprises a first unique capability, the first unique capability is a physical uplink shared channel (PUSCH) preparation duration, T1, and an uplink bandwidth part (BWP) switching duration, T2, that correspond to the terminal device on a first radio frequency channel, and the air-interface slice supported by the terminal device requires a PUSCH timing duration, T3; and
responsive to determining that T3 is greater than or equal to a maximum value between T1 and T2, the capability indicated by the capability configuration information comprises the first unique capability.

12. The apparatus according to claim 9, wherein the capability candidate set comprises at least one shared capability, and the at least one shared capability is a capability whose quantity does not increase with the quantity of air-interface slices.

13. An apparatus, comprising:
at least one processor configured to:
transmit information reporting a capability candidate set of the apparatus to a network device;
receive capability configuration information from the network device, wherein the capability configuration information indicates a capability corresponding to an air-interface slice supported by the apparatus, and the capability corresponding to the air-interface slice supported by the apparatus is determined from the capability candidate set reported by the apparatus; and
communicate, in accordance with the capability indicated by the capability configuration information, with the network device in the air-interface slice supported by the apparatus,
wherein the capability candidate set comprises a first shared capability, the first shared capability is a maximum control channel blind detection capability, and the first shared capability indicates a maximum quantity, B1, of control channel blind detections to be performed by the apparatus; and wherein the capability indicated by the capability configuration information comprises a maximum quantity, B2, of control channel blind detections to be performed by the apparatus in at least two air-interface slices, wherein B2 is less than or equal to B1.

14. The apparatus according to claim 13, wherein the capability candidate set comprises at least one unique capability, and the at least one unique capability includes a capability whose quantity increases with a quantity of air-interface slices.

15. The apparatus according to claim 13, wherein the capability candidate set comprises a first unique capability, the first unique capability is a physical uplink shared channel (PUSCH) preparation duration, T1, and an uplink bandwidth part (BWP) switching duration, T2, that correspond to the apparatus on a first radio frequency channel, and air-interface slices supported by the apparatus require a sum of PUSCH timing duration, T3; and
responsive to determining that T3 is greater than or equal to a maximum value between T1 and T2, the capability indicated by using the capability configuration information comprises the first unique capability.

16. The apparatus according to claim 13, wherein the capability candidate set comprises at least one shared capability, and the at least one shared capability is a capability whose quantity does not increase with the quantity of air-interface slices.

* * * * *

UNITED STATES PATENT AND TRADEMARK OFFICE
CERTIFICATE OF CORRECTION

PATENT NO. : 12,035,417 B2  
APPLICATION NO. : 17/372306  
DATED : July 9, 2024  
INVENTOR(S) : Li et al.

Page 1 of 1

It is certified that error appears in the above-identified patent and that said Letters Patent is hereby corrected as shown below:

In the Claims

Claim 1: Column 19, Line 14: reads as "face slice supported by the terminal devices," should read as -- face slice supported by the terminal device, --.

Claim 4: Column 19, Line 45: reads as "and the at least one shared capability is includes a capability" should read as -- and the at least one shared capability includes a capability --.

Claim 9: Column 20, Line 40: reads as "slice supported by the terminal devices," should read as -- slice supported by the terminal device, --.

Signed and Sealed this  
Twenty-second Day of April, 2025

Coke Morgan Stewart  
*Acting Director of the United States Patent and Trademark Office*